June 21, 1932.  E. WILKE  1,863,586

HEAT EXCHANGER

Filed Feb. 18, 1930

INVENTOR
*Ernst Wilke*
BY
ATTORNEYS

Patented June 21, 1932

1,863,586

UNITED STATES PATENT OFFICE

ERNST WILKE, OF HEIDELBERG, GERMANY, ASSIGNOR TO I. G. FARBENINDUSTRIE AKTIENGESELLSCHAFT, OF FRANKFORT-ON-THE-MAIN, GERMANY

HEAT EXCHANGER

Application filed February 18, 1930, Serial No. 429,255, and in Germany September 10, 1928.

The present invention relates to improved heat exchangers operated on the counterflow principle.

The heat exchangers of the type usually employed, such as for example tubular exchangers, consist of spaces separated by walls by which the fluids, that is to say liquid or gaseous media, are passed in opposite directions. In order to ensure good heat exchange the walls consist of a material having a good thermal conductivity, for example, metal. Nevertheless the effect of such heat exchangers is not satisfactory. This is probably due to the great deal of heat flowing through the wall in the direction of the fluid currents. Heat exchangers are also known in which the separating walls consist of material of poor thermal conductivity, such as, for example, chamotte which is a refractory material consisting mainly of aluminium-calcium silicates. In such walls the flow of heat in the direction of the fluid currents is small, but at the same time the heat exchange between the two currents of fluids is also greatly hampered.

I have now found that the said drawbacks are obviated and a good heat exchange ensured with heat exchangers in which the walls confining the passage-ways through which the fluids are passed, and separating them from each other are so composed as to provide for a poor thermal conductivity in the direction of flow of the fluids, but for a good thermal conductivity transverse to the said direction. This is effected by subdividing the walls by which the heat is exchanged consisting of a material having a good thermal conductivity, transversely to the direction of flow of the fluids by means of layers of a material of poor thermal conductivity. As material for the walls of good thermal conductivity preferably metals, such as, for example, copper and aluminium, are used, and as material of poor thermal conductivity in particular such may be employed as warrant at the same time a good tightening effect, for example asbestos and mica.

Figure 1:
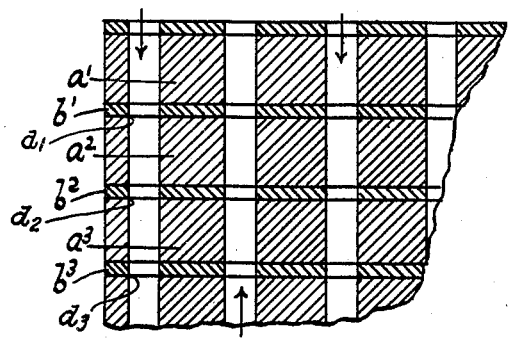
Figure 2:
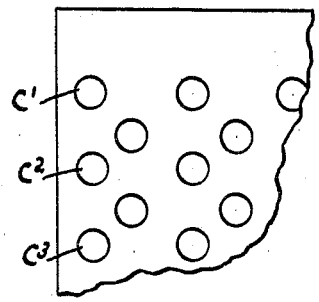

The invention will be further illustrated with reference to the accompanying drawing showing the composition of the heat exchanging parts of an exchanger in longitudinal section in Figure 1 and in cross section in Figure 2.

The heat exchanging parts of the exchanger consists of plates $a_1$, $a_2$, $a_3$ and so on of a material having a good thermal conductivity provided with bores $c_1$, $c_2$, $c_3$ and so on. The said plates are superimposed on each other with tightening layers of material of poor thermal conductivity $b_1$, $b_2$, $b_3$ provided with bores $d_1$, $d_2$, $d_3$ corresponding to those of the aforesaid plates inserted between the said plates. The hot fluids are passed through one set of bores and the fluids to be heated through the other set of bores in the opposite direction.

What I claim is:—

1. A heat exchanger comprising at least two passage-ways for passing fluids therethrough confined by and separated from each other by wall consisting of metal subdivided transversely to the direction of flow of said fluid by at least one layer of a material of poor thermal conductivity.

2. A heat exchanger comprising a metallic plates and plates of a material of poor thermal conductivity, said plates being alternately superimposed on each other in a tight manner and provided with registering bores.

In testimony whereof I have hereunto set my hand.

ERNST WILKE.